(12) United States Patent
McGregor

(10) Patent No.: US 6,460,699 B1
(45) Date of Patent: Oct. 8, 2002

(54) TACKLE BOX WITH MULTI-PART CUTTING BOARD SYSTEM

(76) Inventor: Terry W. McGregor, 1922 McClelland, Houston, TX (US) 77093

( * ) Notice: Subject to any disclaimer, the term of this patent is extended or adjusted under 35 U.S.C. 154(b) by 19 days.

(21) Appl. No.: 09/804,662

(22) Filed: Mar. 12, 2001

(51) Int. Cl.[7] .............................................. B65D 85/00
(52) U.S. Cl. .............. 206/315.11; 206/349; 269/289 R
(58) Field of Search ....................... 206/315.1, 315.11, 206/349; 43/54.1, 57.1; 211/70.1; 220/318; 269/289 R, 907; 312/205, 257.1, 265.5

(56) References Cited

U.S. PATENT DOCUMENTS

| | | | | |
|---|---|---|---|---|
| 4,958,730 A | * | 9/1990 | Bunten | 206/315.11 |
| 5,366,071 A | * | 11/1994 | Laszlo | 206/315.11 |
| 5,864,981 A | * | 2/1999 | Zeman | 206/315.11 |
| 6,047,841 A | * | 4/2000 | Chen | 206/349 |
| 6,371,298 B1 | * | 4/2002 | Bowman | 269/289 R |

* cited by examiner

Primary Examiner—Luan K. Bui
(74) Attorney, Agent, or Firm—Joseph N. Breaux

(57) ABSTRACT

A tackle box with multi-part cutting board system that includes a tackle box housing and a multi-part cutting board system including a first cutting board part, a second cutting board part, and multiple resilient inserts for maintaining the first cutting board part in connection with the second cutting board part. The tackle box housing including first and second board part storage cavities formed therein. Each of the first and second board part storage cavities being sized and shaped to frictionally receive and hold a respective first or second cutting board part.

1 Claim, 2 Drawing Sheets

TACKLE BOX WITH MULTI-PART CUTTING BOARD SYSTEM

TECHNICAL FIELD

The present invention relates to fishing accessories and more particularly to a tackle box with multi-part cutting board system that includes a tackle box housing and a multi-part cutting board system including a first cutting board part, a second cutting board part, and multiple resilient inserts for maintaining the first cutting board part in connection with the second cutting board part; the tackle box housing including first and second board part storage cavities formed therein; each of the first and second board part storage cavities being sized and shaped to frictionally receive and hold a respective first or second cutting board part; the first cutting board part being provided with multiple dove tail grooves formed along a first connecting edge thereof; the second cutting board part having a second cutting board connecting edge having multiple dove tail extensions each companionately positioned and sized to interlock within a respective one of the multiple dove tail grooves formed along the first board connecting edge of the first cutting board part; each of the multiple inserts being positionable within a respective one of the dove tail groove; each insert maintaining the respective dove tail extensions in resiliently locked connection with its companionate dove tail groove.

BACKGROUND ART

Many fisherman like to clean the fish caught prior to returning home so as to eliminate the fishy smell that can linger for days. Although they desire to clean the fish, they often are unable to clean the fish because they do not have a cutting board on which to clean the fish. It would be desirable, therefore, to have a tackle box that included a multi-part cutting board that could be interlocked together when need and disassembled and stored within a tackle box housing when not needed.

GENERAL SUMMARY DISCUSSION OF INVENTION

It is thus an object of the invention to provide a tackle box with multi-part cutting board system that includes a tackle box housing and a multi-part cutting board system including a first cutting board part, a second cutting board part, and multiple resilient inserts for maintaining the first cutting board part in connection with the second cutting board part; the tackle box housing including first and second board part storage cavities formed therein; each of the first and second board part storage cavities being sized and shaped to frictionally receive and hold a respective first or second cutting board part; the first cutting board part being provided with multiple dove tail grooves formed along a first connecting edge thereof; the second cutting board part having a second cutting board connecting edge having multiple dove tail extensions each companionately positioned and sized to interlock within a respective one of the multiple dove tail grooves formed along the first board connecting edge of the first cutting board part; each of the multiple inserts being positionable within a respective one of the dove tail groove; each insert maintaining the respective dove tail extensions in resiliently locked connection with its companionate dove tail groove.

Accordingly, a tackle box with multi-part cutting board system is provided. The tackle box with multi-part cutting board system includes a tackle box housing and a multi-part cutting board system including a first cutting board part, a second cutting board part, and multiple resilient inserts for maintaining the first cutting board part in connection with the second cutting board part; the tackle box housing including first and second board part storage cavities formed therein; each of the first and second board part storage cavities being sized and shaped to frictionally receive and hold a respective first or second cutting board part; the first cutting board part being provided with multiple dove tail grooves formed along a first connecting edge thereof; the second cutting board part having a second cutting board connecting edge having multiple dove tail extensions each companionately positioned and sized to interlock within a respective one of the multiple dove tail grooves formed along the first board connecting edge of the first cutting board part; each of the multiple inserts being positionable within a respective one of the dove tail groove; each insert maintaining the respective dove tail extensions in resiliently locked connection with its companionate dove tail groove.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
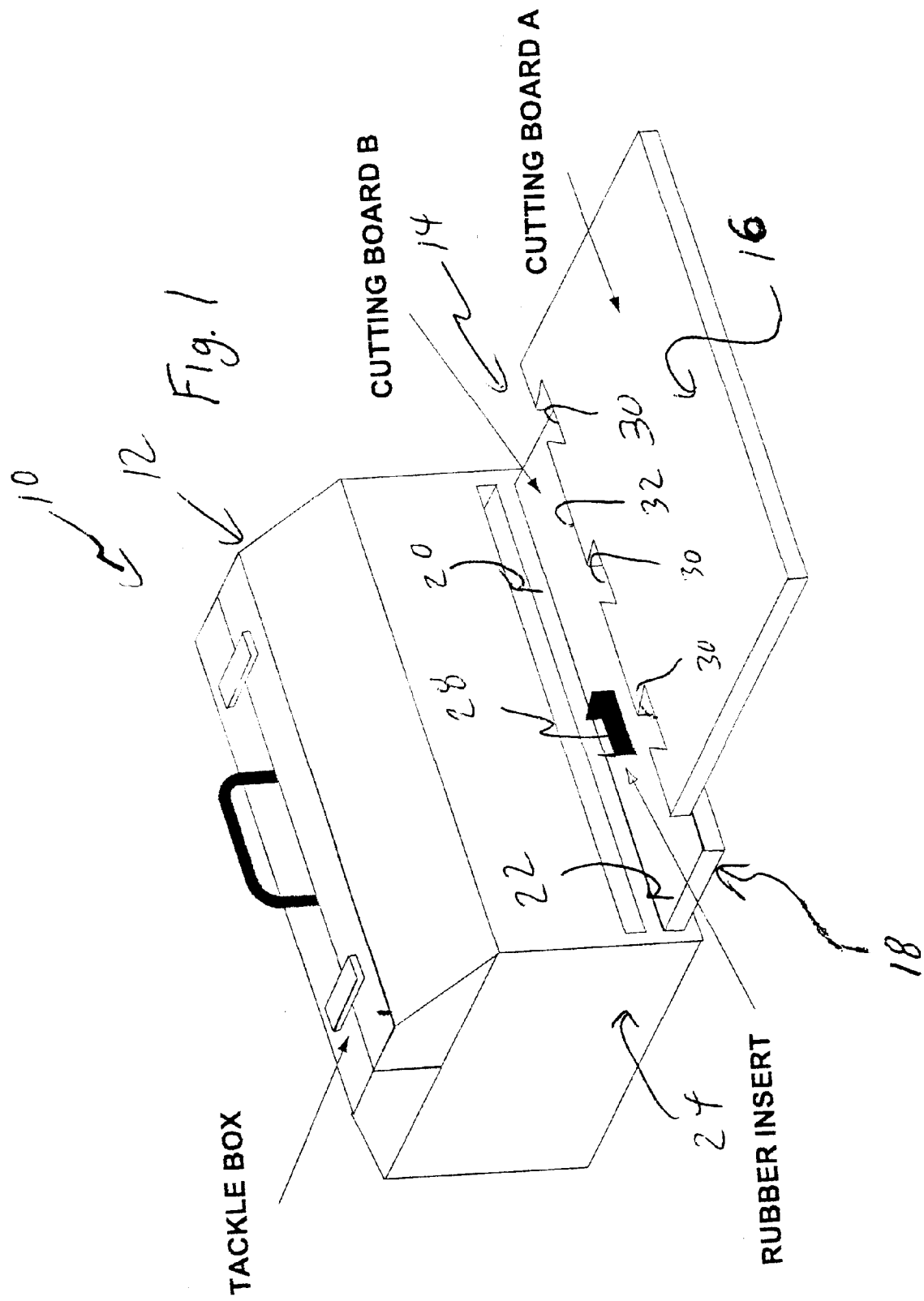
FIG. 1 is a perspective view of an exemplary embodiment of the tackle box with multi-part cutting board system of the present invention showing a first cutting board part of the multi-part cutting board removed from the first board part storage cavity formed in the bottom of the tackle box housing; one of the rubber inserts positioned within each of the three dove tail grooves formed along a first connecting edge of the first cutting board part.
Figure 2:
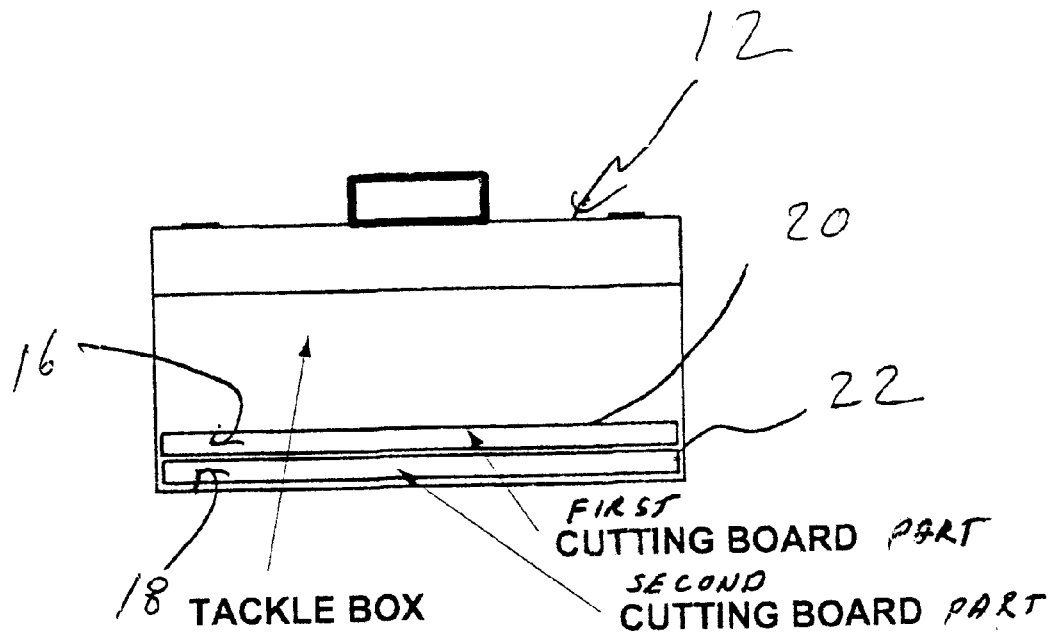
FIG. 2 is a front plan view of the tackle box with multi-part cutting board system with the first and second cutting board parts stored, respectively, in the first and second board part storage cavities.
Figure 3:
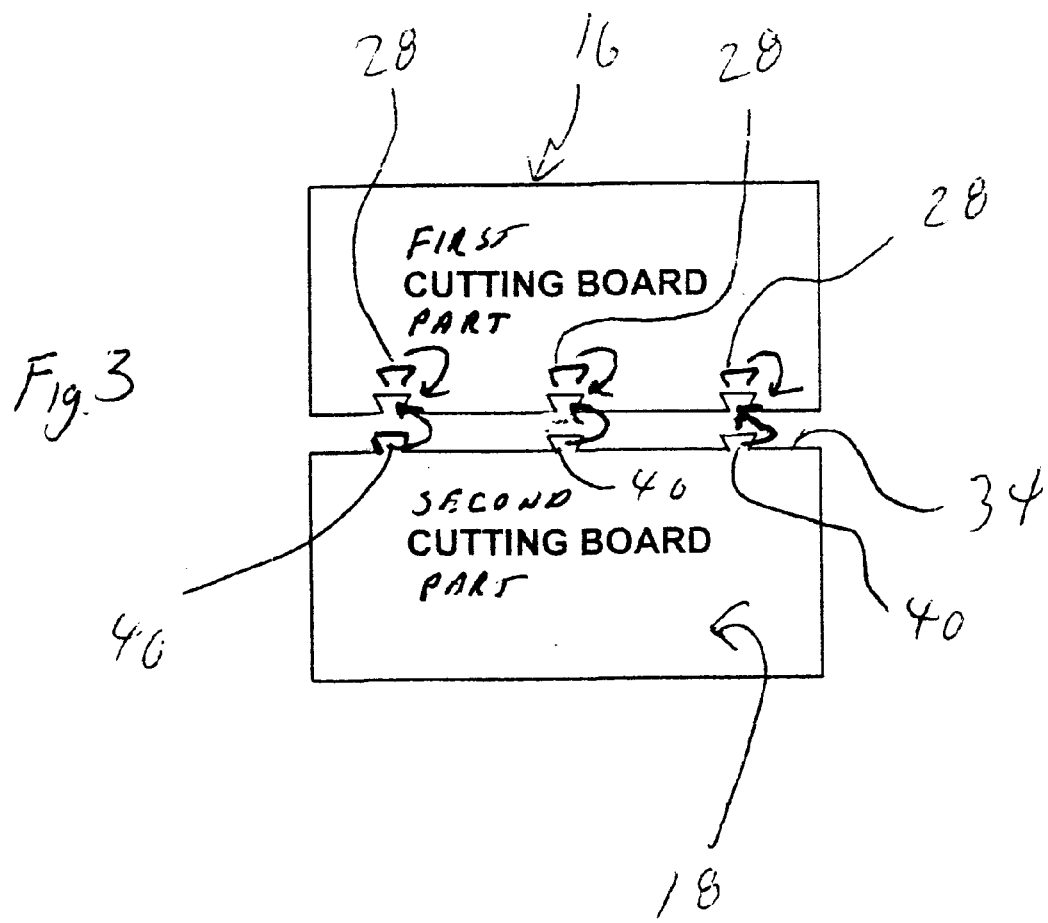
FIG. 3 is top plan view showing the first cutting board part, the second cutting board part, and the three rubber inserts positioned within each of the dove tail grooves formed along a first board connecting edge of the first cutting board part; the second cutting board part having a second cutting board connecting edge having three dove tail extensions companionately positioned and sized to interlock within a respective one of the three dove tail grooves formed along a first board connecting edge of the first cutting board part after one of the three rubber inserts is positioned within the dove tail groove; each rubber insert maintaining the respective dove tail extensions in resiliently locked connection with its companionate dove tail groove.

FIG. 1 shows various aspects of an exemplary embodiment of the tackle box with multi-part cutting board system of the present invention generally designated 10. tackle box with multi-part cutting board system 10 includes a tackle box housing, generally designated 12; and a multi-part cutting board system, generally designated 14; including a first cutting board part, generally designated 16; a second cutting board part, generally designated 18; and three resilient rubber inserts 28 for maintaining the first cutting board part 16 in connection with the second cutting board part 18.

Tackle box housing 12 is of molded plastic construction and includes a first and a second board part storage cavity, 20,22 respectively, formed in a bottom section, generally designated 24, thereof. Each of the first and second board part storage cavities 20,22 is sized and shaped to frictionally receive and hold a respective first or second cutting board part 16,18.

First cutting board part 16 is provided with three dove tail grooves 30 formed along a first connecting edge 32 thereof. Second cutting board part 18 has a second cutting board connecting edge 34 has three dove tail extensions 40 that are each companionately positioned and sized to interlock within a respective one of the three dove tail grooves 30 formed along the first board connecting edge 32 of first cutting board part 16. Each of the multiple inserts 28 is positionable within a respective one of the dove tail grooves 30 prior to inserting the respective three dove tail extensions 40 therein. Each insert 28 maintains the respective dove tail extension 40 in resiliently locked connection with its companionate dove tail groove 30 to allow a user to use first and second cutting board parts 16,18 as a single cutting board for cleaning fish. When the fish cleaning is completed, the user disconnects first and second cutting board parts 16, 18, cleans them and then stores each cutting board part 16,18 in its respective board part storage cavity, 20,22.

It can be seen from the preceding description that a tackle box with multi-part cutting board system has been provided.

It is noted that the embodiment of the tackle box with multi-part cutting board system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A tackle box with multi-part cutting board system comprising:

a tackle box housing; and a multi-part cutting board system including a first cutting board part, a second cutting board part, and multiple resilient inserts for maintaining the first cutting board part in connection with the second cutting board part;

the tackle box housing including first and second board part storage cavities formed therein;

each of the first and second board part storage cavities being sized and shaped to frictionally receive and hold a respective first or second cutting board part;

the first cutting board part being provided with multiple dove tail grooves formed along a first connecting edge thereof;

the second cutting board part having a second cutting board connecting edge having multiple dove tail extensions each companionately positioned and sized to interlock within a respective one of the multiple dove tail grooves formed along the first board connecting edge of the first cutting board part;

each of the multiple inserts being positionable within a respective one of the dove tail groove;

each insert maintaining the respective dove tail extensions in resiliently locked connection with its companionate dove tail groove.

* * * * *